US011360757B1

(12) United States Patent
Roy

(10) Patent No.: US 11,360,757 B1
(45) Date of Patent: Jun. 14, 2022

(54) REQUEST DISTRIBUTION AND OVERSIGHT FOR ROBOTIC DEVICES

(71) Applicant: Amazon Technologies, Inc., Seattle, WA (US)

(72) Inventor: Gourav Roy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 16/449,081

(22) Filed: Jun. 21, 2019

(51) Int. Cl.
| | |
|---|---|
| *G06F 9/445* | (2018.01) |
| *G06F 8/65* | (2018.01) |
| *B25J 9/16* | (2006.01) |
| *H04L 67/00* | (2022.01) |
| *G05D 1/00* | (2006.01) |

(52) U.S. Cl.
CPC ............. *G06F 8/65* (2013.01); *B25J 9/1656* (2013.01); *G05D 1/0027* (2013.01); *H04L 67/34* (2013.01); *G05B 2219/50391* (2013.01)

(58) Field of Classification Search
CPC ........ G06F 8/65; B25J 9/1656; G05D 1/0027; H04L 67/34; G05B 2219/50391
See application file for complete search history.

(56) References Cited

U.S. PATENT DOCUMENTS

| | | | |
|---|---|---|---|
| 2018/0200891 A1* | 7/2018 | Erickson | G05D 1/0214 |
| 2019/0049975 A1* | 2/2019 | Kattepur | G06Q 10/087 |
| 2019/0374292 A1* | 12/2019 | Barral | A61B 34/30 |

* cited by examiner

*Primary Examiner* — Chuck O Kendall
(74) *Attorney, Agent, or Firm* — Davis Wright Tremaine LLP

(57) ABSTRACT

A robotic device management service obtains a request from a client device to cause a fleet of robotic devices operating at a remote facility to perform a set of tasks. In response to obtaining the request, the robotic device management service stores the request in a queue associated with the fleet of robotic devices. A distribution device at the facility queries the queue to obtain the request and, in response to obtaining the request, schedules performance of the set of tasks by the fleet of robotic devices.

20 Claims, 8 Drawing Sheets

REQUEST DISTRIBUTION AND OVERSIGHT FOR ROBOTIC DEVICES

BACKGROUND

Autonomous devices and other robotic devices are becoming ubiquitous in the day-to-day lives of many users in recent times. For instance, much research and development is being invested in autonomous vehicles for passengers, freight, and other purposes. Robotic devices are also utilized in manufacturing to reduce costs and expedite the manufacturing process. However, these robotic devices may generate significant amount of data. As a result, users may utilize significant amounts of bandwidth to obtain and process this data from the robotic devices. Additionally, distributing requests and other data to the robotic devices from a user can also utilize significant amount of bandwidth, thereby slowing the ability of these robotic devices to be updated or to otherwise execute operations for fulfillment of these requests.

BRIEF DESCRIPTION OF THE DRAWINGS

Various techniques will be described with reference to the drawings, in which.

DETAILED DESCRIPTION

Figure 1:
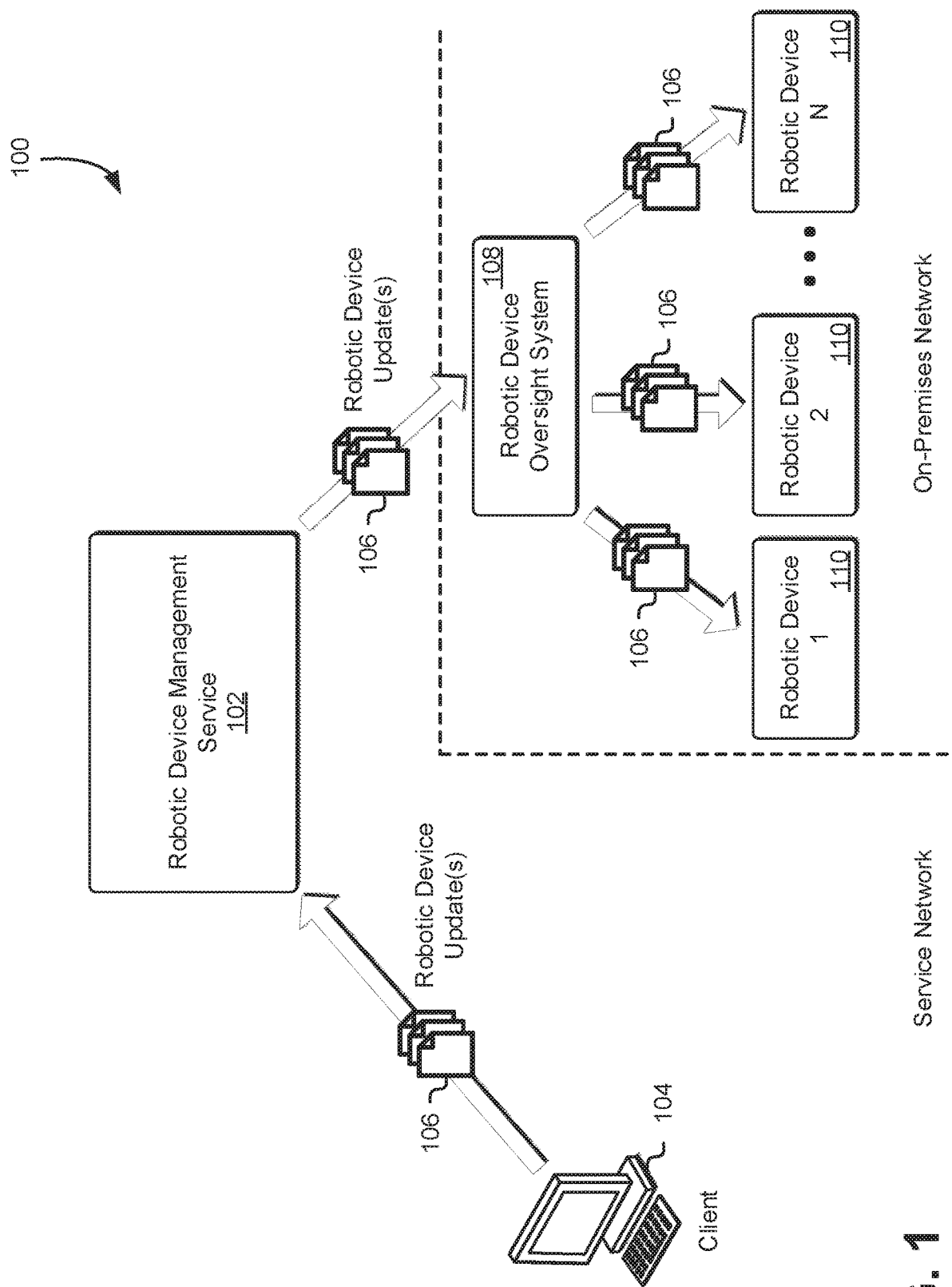
FIG. 1 shows an illustrative example of a system in which various embodiments can be implemented.

Techniques described and suggested herein relate to the distribution of requests made by customers of a robotic device management service to a fleet of robotic devices through transmission of the requests to a distribution system operating in a facility where the fleet of robotic devices are operating. In an example, a customer of a robotic device management service transmits, via a client device, a request to the robotic device management service to cause a fleet of robotic devices operating within a remote facility to perform a set of tasks. This set of tasks may include the installation of an update or application on to each robotic device of the fleet, the performance of an operation within the facility, the transmission of performance and/or state information for each robotic device, and the like. In one example, the request specifies a facility identifier usable by the robotic device management service to identify the facility in which the fleet of robotic devices are operating. Additionally, the request may include executable instructions that, if executed by a robotic device, may cause the robotic device to perform the set of tasks. In some instances, the customer may generate, through its client device, a robotic device application utilizing Robot Operating System (ROS) tools and libraries provided by the robotic device management service, provided by a third-party service or supplier, or generated by the customer itself through the client device. The customer may register this robotic device application with the robotic device management service, which may store the robotic device application generated by the customer in a data object provided by an object-based data storage service and request distribution of the application to each robotic device of the fleet of robotic devices specified in the request.

In one example, the robotic device management service stores the request in a queue accessible by a robotic device oversight system operating within the facility where the fleet of robotic devices are operating. The robotic device management service may maintain a persistent connection between the robotic device management service and the robotic device oversight system to allow the robotic device oversight system to access the queue. For instance, the robotic device oversight system, over the persistent connection, may query the queue to determine whether there are available requests that are to be fulfilled using the fleet of robotic devices operating in the facility where the robotic device oversight system is located. If a request is available, the robotic device oversight system may obtain the request from the queue and make it available within a local (e.g., within the facility) datastore for fulfillment by the fleet of robotic devices. For instance, the robotic device oversight system may include a module that may monitor each robotic device of the fleet of robotic devices to determine whether a robotic device is available for fulfillment of the request from the datastore.

In an example, if the robotic device oversight system determines that a robotic device of the fleet of robotic devices is available for fulfillment of a request obtained from the queue, the robotic device oversight system transmits executable instructions to the robotic device to cause the robotic device to perform the set of tasks specified in the request. For instance, if the request is to update the robotic devices of the fleet of robotic devices, the robotic device oversight system may transmit a data package comprising the update to the robotic device to cause the robotic device to install the update. Alternatively, if the request is for performance and/or state information from the fleet of robotic devices, the robotic device oversight system may transmit the request to the available robotic device to cause the robotic device to generate or otherwise provide the requested information. In one example, the robotic device oversight system monitors execution of the executable instructions and/or performance of a set of tasks for fulfillment of the request to ensure that the request is being fulfilled in accordance with the parameters of the request.

In an example, the robotic device oversight system obtains data from each robotic device of the fleet of robotic devices generated in response to the request from the customer of the robotic device management service. In response to obtaining this data, the robotic device oversight system may determine whether it has obtained sufficient responses from the fleet of robotic devices to fulfill the request from the customer. For instance, if the customer has requested information specifying the performance of the overall fleet of robotic devices in the facility, the robotic device oversight system may determine whether it has obtained sufficient data from the fleet of robotic devices such that the robotic device oversight system may aggregate this data and generate the requested information. If the robotic device oversight system has obtained sufficient data for fulfillment of the request from the customer, the robotic device oversight system may aggregate this data from the robotic devices of the fleet of robotic devices and provide the aggregated data to the robotic device management service. This may cause the robotic device management service to provide the aggregated data to the customer to fulfill the request.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For example, because the robotic device oversight system obtains the request from the robotic device management service for distribution to a fleet of robotic devices, the replication of data that may be transmitted to the robotic devices of the fleet may be performed by the robotic device oversight system locally (e.g., within the facility where the robotic devices and the robotic device oversight system are located). This may reduce the amount of bandwidth required for the persistent connection between the robotic device management service, which may be operating within a first network, and the robotic device oversight system, which may be operating within a second network. Additionally, because the robotic device oversight system may aggregate the data obtained from the various robotic devices of the fleet, the robotic device oversight system may reduce the amount of data that is transmitted over the persistent connection to the robotic device management service, thereby reducing the amount of bandwidth required for providing data usable to fulfill customer requests.

FIG. 1 shows an illustrative example of a system 100 in which various embodiments can be implemented. In the system 100, a customer of the robotic device management service 102, through a client device 104, submits a request to the robotic device management service 102 to install a robotic device update 106 onto robotic devices 110 of a fleet of robotic devices operating within a remote facility. The robotic device update 106 may include a software data package that may be used to update the software of each of the robotic devices 110. Alternatively, the robotic device update 106 may include a machine learning model, which each of the robotic devices 110 may use to process data and determine next operations within a facility. This machine learning model may supersede an existing machine learning model utilized by the robotic devices 110. In some instances, the customer of the robotic device management service 102, through the client device 104, may transmit a Structured Query Language (SQL) query or other executable instructions to the robotic device management service 102 to cause robotic devices of a fleet of robotic devices 110 to perform a set of operations. The fleet of robotic devices 110 may be operating within an on-premises network or other communications network distinct from the network of the client device 104. The robotic device management service 102 may comprise a collection of computing resources that collectively operate to enable customers of the robotic device management service 102 to communicate with robotic devices 110 in other communications networks, obtain data (e.g., state information, performance information, etc.) from these robotic devices 110 through the robotic device management service 102, and to provide customers with flexibility to generate their own ROS tools and libraries using their own client devices 104 and utilize these ROS tools and libraries locally to process data from the robotic devices 110. For example, through the client device 104, a customer may define a robotic device application that leverages services that convert text into speech, which may be used to enable communication between a robotic device 110 and the customer using natural language understanding (NLU). Additionally, the customer may define an application that leverages a video streaming service of a computing resource service provider to enable real-time streaming of video captured by a robotic device 110 to the client device 104 via the robotic device management service 102. Thus, the robotic device management service 102 may serve to coordinate interactions between the client device 104 and the fleet of robotic devices.

In an embodiment, the robotic device management service 102 evaluates the request from the client device 104 to identify the facility in which the fleet of robotic devices 110 that are to install the robotic device update 106 are located. For instance, the request from the client device 104 may specify a facility identifier which may correspond to the facility in which the fleet of robotic devices 110 is located. Alternatively, the request may include information that may be used to identify the fleet of robotic devices 110 that are to install the robotic device update 106. The robotic device management service 102 may utilize this information to identify the facility in which the fleet of robotic devices 110 are operating. In an embodiment, the customer, through the robotic device management service 102, can register a set of robotic devices with the robotic device management service 102 to enable organization of these robotic devices into logical groupings, such as fleets, that may be maintained by the robotic device management service 102. Robotic devices may include autonomous devices (e.g., "driverless" vehicles, appliances, unmanned aerial vehicles, space exploration vehicles, satellites, etc.) that may perform operations based on sensor data collected via analysis of a surrounding environment of the autonomous devices. It should be noted that robotic devices, as described throughout the disclosure, may refer to physical robotic devices and/or to simulated robotic devices, which may be a representation of the physical robotic devices but in a simulated environment.

Through the robotic device management service 102, the customer may utilize various application programming interface (API) calls to register a new robotic device. For example, the customer may submit, through use of a RegisterDevice( ) API call, a unique name for the robotic device that may be used to associate the robotic device with the customer's account. In an embodiment, the RegisterDevice( ) API call is required for registration of the robotic device and the name of the robotic device, a unique Internet-of-Things (IoT) name of the robotic device, and the name of the logical grouping to which the robotic vehicle belong to is provided as a string. For instance, through the RegisterDevice( ) API, the customer may define the logical grouping (e.g., fleet) that the robotic device is to be a part of. This logical grouping may be an existing grouping of robotic devices 110 previously created by the customer or a new logical grouping that the customer has defined. Thus, through the use of a RegisterDevice( ) API, the customer may define a fleet of robotic devices 110 within each remote facility where these robotic devices may be operating. It should be noted that a fleet of robotic devices 110 may encompass the entire set of robotic devices within a facility, a subset of the set of robotic devices within a facility, or multiple sets of robotic devices operating within various facilities.

In an embodiment, a client device agent is provided by the robotic device management service 102 for installation on the client device 104. This client device agent may be implemented as a process or other executable code that, if executed, serves as a conduit for customer-generated ROS tools and libraries to transmit commands and other requests to the robotic device management service 102 for transmission to individual robotic devices or to a fleet of robotic devices 110 for execution of commands or to cause the fleet of robotic devices 110 to generate and provide state information usable by the customer-generated ROS tools and libraries to determine the state of the fleet of robotic devices 110 operating in the on-premises or other communications network. In an embodiment, the robotic device management service 102 exposes an API command to the client device agent that enables the client device agent to submit a request to the robotic device management service 102 to register a newly created or existing ROS tool operating on the client device 104. The robotic device management service 102, in response to the request from the client device agent to register a ROS tool implemented on the client device 104, may store information related to the ROS tool within a customer account. This information may specify the one or more robotic devices and/or fleets of robotic devices that the ROS tool may require to provide state information, provide configuration information of the robotic devices, or other data usable to perform a set of operations for optimizing the robotic devices. For instance, an ROS tool may utilize state information related to the battery performance of a fleet of robotic devices 110 to determine whether the battery performance is within acceptable parameters or whether changes to the configuration of the robotic devices of the fleet are required to achieve optimal battery performance within the facility where the fleet of robotic devices 110 is operating. Further, an ROS tool may utilize configuration information of the robotic devices to identify the configuration of the robotic devices at a given time so as to determine whether to make any changes to the configuration of these robotic devices.

In an embodiment, the robotic device management service 102, in response to the request from the customer to install the robotic device update 106 onto robotic devices of a fleet of robotic devices 110, stores the request in a queue accessible by a robotic device oversight system 108 operating within the facility and/or on-premises network where the fleet of robotic devices 110 is located. In an embodiment, the robotic device management service 102 maintains a persistent network connection with the robotic device oversight system 108, through which data may be transmitted to the robotic device oversight system 108 and obtained from the robotic device oversight system 108. The robotic device oversight system 108 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. For instance, the robotic device oversight system 108 may be implemented on a server or other computing device operating within the facility where the fleet of robotic devices 110 are operating. In an embodiment, the robotic device oversight system 108 is implemented across multiple servers or computing devices within the facility. This may provide redundancy to the system 108 in the event that a server or computing device is rendered inoperable within the facility.

In an embodiment, the robotic device oversight system 108 is implemented utilizing computing devices that may be physically transported from the facility or on-premises network to the robotic device management service 102. For instance, a robotic device management service 102 may store data usable for fulfillment of the request within the computing device and transport the computing device to the facility for installation at the facility where the fleet of robotic devices 110 are located. Once the computing device has been installed at the facility, the computing device may initiate the robotic device oversight system 108 and initiate processing of the request to cause the fleet of robotic devices 110 to execute operations for fulfillment of the request. The computing device may record data from the fleet of robotic devices 110 (as described in greater detail below) and may be transported, via delivery service or other transport method, to the robotic device management service 102, which may store the data from the robotic device oversight system 108 within a logical data container, datastore, repository, or other storage device that the customer may access via the robotic device management service 102. Alternatively, once the computing device has been installed at the facility and the robotic device oversight system 108 has been initiated, the computing device may establish a persistent communications channel with the robotic device management service 102. Thus, as the robotic device oversight system 108 obtains data from the fleet of robotic devices 110, the robotic device oversight system 108 may transmit the data to the robotic device management service 102 over the persistent communications channel.

Through the persistent network connection with the robotic device management service 102, the robotic device oversight system 108 may query a queue of the robotic device management service 102 to determine whether a request is available that is to be processed using the fleet of robotic devices 110 operating within the facility or on-premises network that the robotic device oversight system 108 is a part of. If a request is available, the robotic device oversight system 108 may obtain the request from the queue, along with any other data (e.g., robotic device update 106, executable instructions or code, etc.) that may be used by the fleet of robotic devices 110 for fulfillment of the request. If a request is not available within the queue, the robotic device oversight system 108 may query the queue at a later time or in response to a triggering event (e.g., an indication that a request has been added to the queue, an existing request has been fulfilled by the fleet of robotic devices 110, etc.).

If the robotic device oversight system 108 obtains a request from the queue maintained by the robotic device management service 102, the robotic device oversight system 108 may evaluate the request to identify the operations that are to be performed by each robotic device of the fleet of robotic devices 110. The identification of these operations may be used to determine whether a robotic device is immediately available to perform these operations and provide a response to the robotic device oversight system 108. For example, the robotic device oversight system 108 may evaluate a robotic device to determine the operations being executed by the robotic device as well as the potential impact to the robotic device and its environment if the operations required for fulfillment of the request are executed. If the robotic device oversight system 108 determines that the robotic device is not available for fulfillment of the request, the robotic device oversight system 108 may wait until the robotic device is capable of performing the operations required for fulfillment of the request to transmit executable instructions and other data to the robotic device to cause the robotic device to perform the operations. In an embodiment, a robotic device is unavailable for performing operations required for fulfillment of the request if the robotic device is in the process of executing other operations associated with another, previously obtained request.

If the robotic device oversight system 108 determines that a robotic device of the fleet of robotic devices 110 is available for fulfillment of the request, the robotic device oversight system 108 may transmit executable instructions to the robotic device to cause the robotic device to perform a set of operations for fulfillment of the request. For example, the robotic device oversight system 108 may transmit the robotic device update 106 to the robotic device for installation of the robotic device update 106 on to the robotic device. As another example, if the request is to obtain state information or other data from the robotic device, the robotic device oversight system 108 may transmit executable instructions to the robotic device to cause the robotic device to generate or otherwise obtain the requested state information or other data.

In an embodiment, the robotic device oversight system 108 monitors each robotic device of the fleet of robotic devices 110 to determine whether the set of operations associated with the customer request are being performed successfully. For instance, the robotic device oversight system 108 may monitor each robotic device of the fleet of robotic devices 110 to determine whether installation of the robotic device update 106 is being performed successfully. If the robotic device oversight system 108 determines that a robotic device is encountering an issue related with installation of the robotic device update 106 (e.g., installation has stalled on the robotic device, the robotic device is taking longer than usual to install the update 106, downtime resulting from the installation of the update 106 is negatively impacting other robotic devices, etc.), the robotic device oversight system 108 may transmit a request to the impacted robotic device to cause the robotic device to roll back the robotic device update 106. Further, the robotic device oversight system 108 may transmit a notification to the robotic device management service 102 to indicate that installation of the robotic device update 106 on to the robotic device was unsuccessful.

In an embodiment, the robotic device oversight system 108 can compile and aggregate data obtained from the robotic devices of the fleet of robotic devices 110 in order to fulfill the customer request. For instance, in its request to the robotic device management service 102, the customer may provide a SQL query or other executable instructions that, if executed by the robotic device oversight system 108, cause the robotic device oversight system 108 to process the state information or other data provided by the robotic devices of the fleet of robotic devices 110 corresponding to the parameters defined in the SQL query or executable instructions and provide the output generated as a result of processing the state information or other data in accordance with the SQL query or executable instructions. Thus, rather than the robotic device oversight system 108 transmitting the complete state information or other data provided by each robotic device to the robotic device management service 102 in response to a request from the client device to obtain this state information or data, the robotic device oversight system 108 may provide processed or aggregated data that may serve as output to a particular SQL query or other executable instruction from the client device 104.

The robotic device oversight system 108 may evaluate any obtained SQL query or executable instructions obtained from the robotic device management service 102 for processing of state information or other data from the robotic devices of the fleet of robotic devices 110 to identify a threshold amount of responses required from the robotic devices of the fleet for fulfillment of the request from the customer. For instance, the robotic device oversight system 108 may evaluate the SQL query or other executable instructions to identify what information is to be provided to the customer for fulfillment of the request. Further, the robotic device oversight system 108 may identify any contingencies should a robotic device fail to provide data usable by the robotic device oversight system 108 to generate an output to the SQL query or other executable instructions for fulfillment of the customer request. For example, if the request is to obtain metrics related to the efficiency of the robotic devices operating within the facility, the failure of a robotic device to provide data usable to determine its efficiency within the facility may be used by the robotic device oversight system 108 to indicate a negative impact to the efficiency of the overall fleet of robotic devices 110 within the facility. Alternatively, based on the obtained SQL query or executable instructions, the robotic device oversight system 108 may indicate, if a threshold number of robotic devices were unable to provide the requested data to the robotic device oversight system 108 for aggregation, that the request cannot be fulfilled due to the identified failures of these robotic devices.

In an embodiment, the customer, through the client device 104, can provide a machine learning model usable by the robotic device oversight system 108 to process data from the robotic devices of the fleet of robotic devices 110 and determine the status of the fleet 110 in response to requests from the customer to obtain this status. For instance, using supervised learning techniques, input data (e.g., data generated by each robotic device of a fleet of robotic devices 110) may be used to train the machine learning model to enable detection of issues that may be impacting performance of one or more robotic devices of the fleet of robotic devices 110. For example, data obtained from the robotic devices of the fleet of robotic devices over time may be used to train the machine learning model to identify any issues encountered by one or more robotic devices of the fleet of robotic devices 110 operating within the facility. Additionally, the customer, through the client device 104, may utilize one or more sample vectors to perform one or more simulations to determine whether the functions utilized in the machine learning model are producing correct and accurate results and/or to refine the one or more functions utilized in the machine learning model to produce correct and accurate results. Along with the machine learning model, the customer may provide one or more sample vectors and analytical results (e.g., desired outcomes) that should be obtained based on these one or more sample vectors. In response to obtaining the machine learning model from the robotic device management service 102, the robotic device oversight system 108 may implement the machine learning model and, based on this exercise, adjust the functions utilized by the machine learning model to analyze the vectors corresponding to the various metrics and other data obtained from the robotic devices of the fleet of robotic devices 110.

The robotic device oversight system 108 may receive input from one or more analysts employed by an authority that administers the robotic device management service 102 to analyze the results from the one or more analyses performed by robotic device oversight system 108 through use of the machine learning model described above. For instance, an analyst may review the data from a robotic device of the fleet of robotic devices 110 and the one or more vectors generated by the robotic device oversight system 108 to determine whether the robotic device oversight system 108 is accurately detecting issues with any of the robotic devices of the fleet of robotic devices 110 as they occur within the facility. The analyst may provide his/her input for use in refining the model used to identify any issues impacting the performance of the robotic devices of the fleet of robotic devices 110 within the facility. The vector of measurements corresponding to the review performed by the analyst and the desired outcome corresponding to the analyst's input may be used by the robotic device oversight system 108 to update the model used to classify vector inputs. Such may be performed by multiple analysts and/or using multiple vector inputs to provide the robotic device oversight system 108 a sufficient number of sample vector inputs and desired outputs. The robotic device oversight system 108 may adjust the machine learning model to increase the likelihood that the desired result is obtained in future analyses. Alternatively, the robotic device oversight system 108 may identify additional analyses, using other data generated by the robotic devices of the fleet of robotic devices 110, to verify that a detected issue is not the result of a false positive generated through use of the machine learning model.

Figure 2:
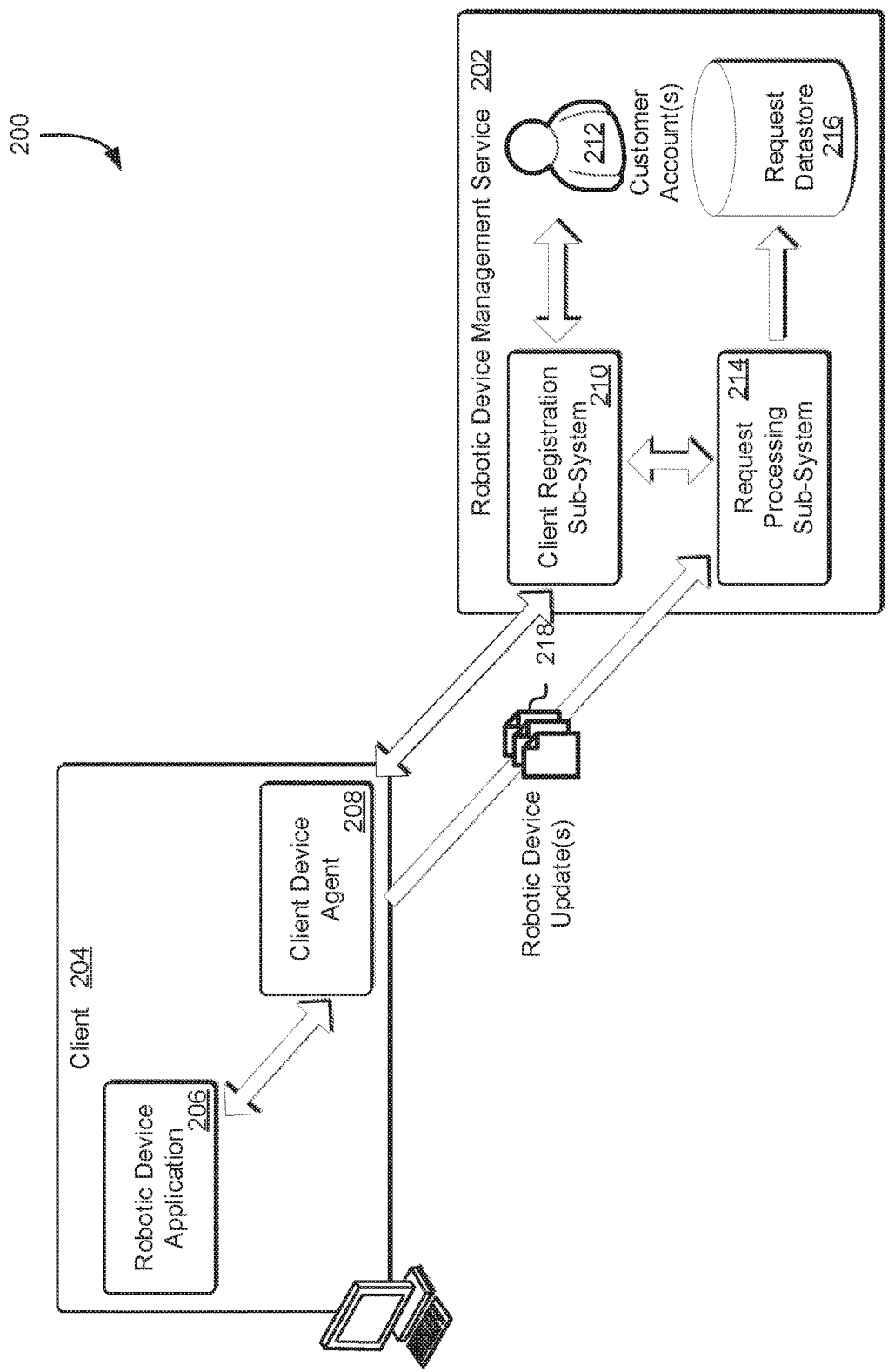
FIG. 2 shows an illustrative example of a system in which a robotic device management service obtains a request from a client device to install an update on to a fleet of robotic devices operating in a remote facility in accordance with at least one embodiment.

FIG. 2 shows an illustrative example of a system 200 in which a robotic device management service 202 obtains a request from a client device 204 to install an update 218 on to a fleet of robotic devices operating in a remote facility in accordance with at least one embodiment. In the system 200, a client device agent 208 installed on a client device 204 transmits a request to a client registration sub-system 210 of a robotic device management service 202 to register a robotic device application 206 with the service 202. The client device agent 208 may be implemented as a process or other executable code that, if executed, serves as a conduit for customer-generated robotic device applications 206 operating on the client device 204 to transmit commands and other requests to the robotic device management service 202 for transmission to fleets of robotic devices for execution of the commands or to cause the robotic devices to generate and provide data usable by the robotic device applications 206 to determine the state of the robotic devices operating in the on-premises or other communications network.

In an embodiment, the client registration sub-system 210 of the robotic device management service 202 exposes an API command to the client device agent 208 that enables the client device agent 208 to submit a request to the client registration sub-system 210 to register a newly created or existing robotic device application 206 operating on the client device 204. The client registration sub-system 210 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The client registration sub-system 210, in response to the request from the client device agent 208 to register a robotic device application 206 operating on the client device 204, may store information related to the robotic device application 206 within a customer account 212 of the customer. This information may specify the fleets of robotic devices that the robotic device application 206 may require to provide state information or other data usable to perform a set of operations for optimizing the fleets of robotic devices. Further, the information may specify identifiers corresponding to facilities where individual fleets of robotic devices may be operating.

In an embodiment, the client device agent 208 installed on the client device 204 can expose a set of API commands that can be invoked by the robotic device application 206 to transmit a request to a fleet of robotic devices operating within a facility or otherwise within an on-premises network. For example, the client device agent 208 may expose a ListTopics( ) API command that may be used to cause individual robotic device oversight systems operating in different facilities or within different on-premises networks to indicate the various topics to which requests may be published for distribution to corresponding fleets of robotic devices. These topics may be organized based on identifiers corresponding to each individual robotic device oversight system or identifiers corresponding to each individual fleet of robotic devices that the customer, through the client device 204, may have access to. Thus, through the client device agent 208, a robotic device application 206 may submit an API call to the request processing sub-system 214 of the robotic device management service 202 to identify the various topics being exposed by the robotic device oversight systems operating in the various facilities that the customer may have access to for the publishing of requests for distribution to fleets of robotic devices. The request processing sub-system 214 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein.

The ListTopics( ) API call may specify an identifier corresponding to a facility in which a fleet of robotic devices are operating and for which the robotic device application 206 may require state information or other data, installation of an update 218, or performance of a set of operations within the facility. In response to obtaining this API call, the request processing sub-system 214 may interact with the client registration sub-system 210 to determine whether the robotic device application 206 that originally submitted the API call to the client device agent 208 is authorized to obtain a listing or other ordering of topics exposed by the robotic device oversight systems within the corresponding facilities. For instance, the client registration sub-system 210 may access the customer account 212 associated with the client device agent 208 to identify the applications registered with the robotic device management service 202 as well as the fleets of robotic devices that the customer may access via these applications.

If the robotic device application 206 is registered with the robotic device management service 202 and is authorized to access the fleets of robotic devices at the specified facilities, the request processing sub-system 214 may publish the request from the client device agent 208 to corresponding topics within the request datastore 216. The request datastore 216 may include, for each robotic device oversight system connected to the robotic device management service 202, a queue through which the robotic device oversight system may obtain requests submitted by client devices, such as client device 204 through its client device agent 208. In an embodiment, the robotic device management service 202 stores, within the queue corresponding to the robotic device oversight system that is to distribute the request to an identified fleet of robotic devices, parameters of the request and any additional data that may be utilized by the fleet of robotic devices and/or the robotic device oversight system for fulfillment of the request. For example, the request processing sub-system 214 may store, within the queue and along with the request, the robotic device updates 218 that are to be installed on to each of the robotic devices of the fleet of robotic devices within the identified facility. Additionally, or alternatively, the request processing sub-system 214 may store executable instructions that, if executed by a robotic device, may cause the robotic device to perform a set of operations for fulfillment of the request. These operations may include, but are not limited to, generating and providing data to the robotic device oversight system for aggregation with other data from other robotic devices. The aggregated data may be provided by the robotic device oversight system to the robotic device management service 202 as described in greater detail below. As another example, the request processing sub-system 214 may store executable instructions that, if executed by the robotic device oversight system, cause the robotic device oversight system to perform various operations for the distribution of the request to the fleet of robotic devices and for the aggregation and processing of data obtained from the various robotic devices of the fleet. For instance, these executable instructions may cause the robotic device oversight system to generate, using data obtained from the various robotic devices of the fleet, an output corresponding to the state of the fleet operating within the facility. As an illustrative example, the robotic device oversight system may obtain battery efficiency data from each of the robotic devices of the fleet and use this battery efficiency data to generate an output corresponding to the overall battery efficiency and performance for the fleet. Thus, rather than providing the individual data sets from each robotic device, the robotic device oversight system may provide an output that serves as an aggregate of these data sets.

Figure 3:
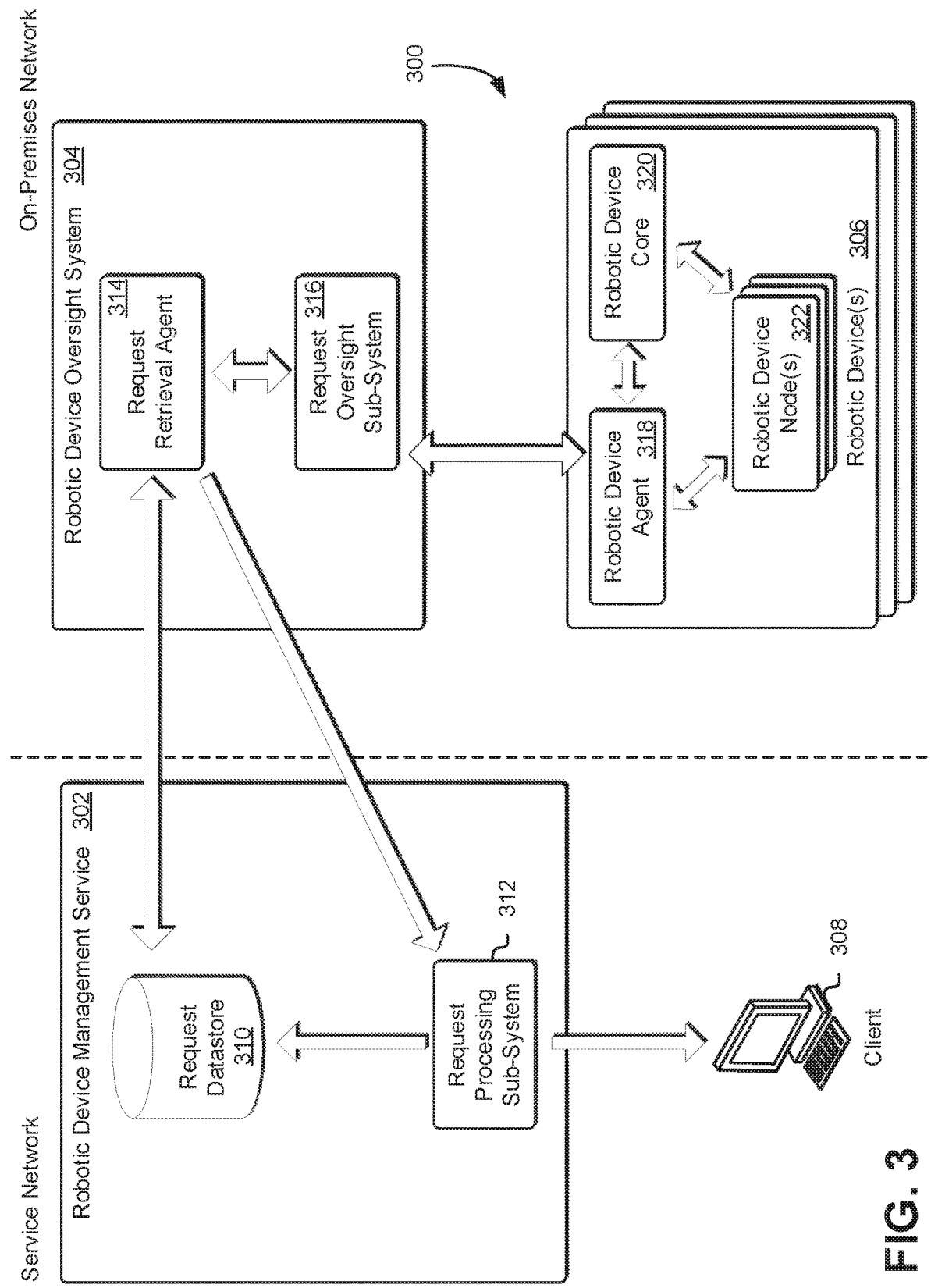
FIG. 3 shows an illustrative example of a system in which a robotic device oversight system obtains, from a request datastore of the robotic device management service, a request that is to be distributed to a fleet of robotic devices within a facility for fulfillment of the request in accordance with at least one embodiment.

FIG. 3 shows an illustrative example of a system 300 in which a robotic device oversight system 304 obtains, from a request datastore 310 of the robotic device management service 302, a request that is to be distributed to a fleet of robotic devices 306 within a facility for fulfillment of the request in accordance with at least one embodiment. In the system 300, the robotic device oversight system 304, through a request retrieval agent 314, queries a request datastore 310 to determine whether a request is available for distribution to a fleet of robotic devices 306. The request retrieval agent 314 may be implemented as a process or other executable code that, if executed, accesses a request datastore 310 over a persistent network connection with the robotic device management service 302 to identify any available requests that are to be fulfilled by a fleet of robotic devices 306 within a facility or on-premises network of the robotic device oversight system 304. In an embodiment, the request retrieval agent 314 used an identifier of the facility where the robotic device oversight system 304 is located or is otherwise assigned to (e.g., the robotic device oversight system 304 may communicate with the fleet of robotic devices 306 over another communications channel, etc.) to query the request datastore 310 to determine whether a request is available that is to be distributed to the various robotic devices of the fleet of robotic devices 306. If a request is not available, the request retrieval agent 314 may wait a pre-determined period of time before submitting another query to the request datastore 310 to determine whether a request has been added to the request datastore 310 that is to be distributed to the fleet of robotic devices 306. If the request retrieval agent 314 determines that a request is available, the request retrieval agent 314 may obtain the request from the request datastore 310 for processing.

It should be noted that in some instances, the request retrieval agent 314, rather than querying the request datastore 310 to determine whether a request is available, may detect that a request has been added to the request datastore 310. For instance, the robotic device management service 310 may transmit, to the request retrieval agent 314, a notification that a request has been added to the request datastore 310 that is to be fulfilled using the fleet of robotic devices 306. In response to this notification, the request retrieval agent 314 may access the request datastore 310 to obtain the request. Thus, rather than periodically querying the request datastore 310 or in addition to periodic queries of the request datastore 310, the request retrieval agent 314 may access the request datastore 310 in response to indications from the robotic device management service 302 that a request has become available for retrieval by the request retrieval agent 314.

In response to obtaining a request from the request datastore 310, the request retrieval agent 314 may make the request available to a request oversight sub-system 316 of the robotic device oversight system 304 for distribution to the various robotic devices of the fleet of robotic devices 306. The request oversight sub-system 316 may be implemented as a process or other executable code that, if executed, causes the request oversight sub-system 316 to distribute the request to the robotic devices of the fleet of robotic devices 306 and process data obtained from the robotic devices in accordance with the parameters of the request. In an embodiment, the request oversight sub-system 316 monitors the fleet of robotic devices 306 to determine whether a robotic device of the fleet is available for fulfillment of the request. For instance, the request oversight sub-system 316 may detect that a robotic device of the fleet has completed executing a set of operations associated with a previously provided request or other task. Additionally, or alternatively, the request oversight sub-system 316 may evaluate the set of operations being performed by a robotic device, as well as the location and status of the robotic device within the facility, to determine whether the robotic device is capable of executing the set of operations required for fulfillment of the request. The request oversight sub-system 316 may additionally determine the impact to the facility and/or to other robotic devices of the fleet should the particular robotic device engage in executing a set of operations for fulfillment of the request. For example, the request oversight sub-system 316 may determine whether execution of a set of operations by a robotic device in order to fulfill the request would negatively impact the performance of other robotic devices within the facility or otherwise serve as a detriment to the facility (e.g., lost productivity, lost earnings, unacceptable downtime for the robotic device, etc.). If so, the request oversight sub-system 316 may forego transmission of the request to the robotic device until the robotic device is capable of executing the set of operations required for fulfillment of the request.

If the request oversight sub-system 316 detects that a robotic device from the fleet of robotic devices 306 is available for fulfillment of the request, the request oversight sub-system 316 may transmit the request, along with any additional data that may be utilized by the robotic device for fulfillment of the request, to a robotic device agent 318 of the robotic device. The robotic device agent 318 may be implemented as a process or other executable code that, if executed, may cause the robotic device agent 318 to obtain requests from the request oversight sub-system 316 and cause other components of the robotic device, as described below, to perform a set of operations for fulfillment of the request. In response to obtaining the request and any additional data from the request oversight sub-system 316, the robotic device agent 318 may obtain, from a robotic device core 320 of the robotic device, metadata from one or more robotic device nodes 322. This metadata may specify the various operations and tasks being performed by the robotic device nodes 322 of the robotic device. The robotic device core 320 may be an application, process, or other executable code that, if executed, causes the robotic device to obtain metadata from each of the set of robotic device nodes 322 (e.g., processors, etc.) of the robotic device. This metadata may specify the state information being generated or otherwise obtained by the corresponding robotic device node 322. Further, the metadata may specify the one or more topics to which the robotic device node 322 is publishing its state information. Additionally, the metadata may specify the operations being performed by the robotic device node 322 for the robotic device.

The robotic device agent 318 may evaluate the metadata obtained from the robotic device core 320 to determine whether the request obtained from the request oversight sub-system 316 can be fulfilled. For instance, if the request is for obtaining state information of the robotic device, the robotic device agent 318 may obtain, from the robotic device core 320, metadata of the various robotic device nodes 322. The robotic device agent 318 may use this metadata to identify which robotic device nodes 322 of the set of robotic device nodes of the robotic device are publishing state information to the topics specified in the request parameters obtained from the request oversight sub-system 316. The robotic device agent 318 may access the robotic device nodes 322 that generate the requested state information and publish this requested state information into the topics specified in the request parameters to obtain this state information of the robotic device. The robotic device agent 318 may provide this state information to the request oversight sub-system 316 to fulfill the request.

In an embodiment, if the request involves installation of an update on to the robotic device, the robotic device agent 318 evaluates the metadata obtained from the robotic device core 320 to determine whether the update can be installed using available robotic device nodes 322 of the robotic device. For instance, using the metadata, the robotic device agent 318 may determine whether the robotic device has sufficient resources (e.g., storage capacity, processing capability, etc.) available to install the update provided by the request oversight sub-system 316. Further, the robotic device agent 318 may determine, using the metadata, whether installation of the update may be detrimental to the robotic device. For example, if the location of the robotic device within the facility would make it burdensome to the robotic device and/or other robotic devices for it to be rendered inoperable during installation of the update, the robotic device agent 318 may determine that the update cannot be installed until the robotic device is at a different location or is otherwise in a position to initiate installation of the update. The robotic device agent 318 may monitor the robotic device nodes 322 that are involved in the installation of the update to ensure that the update is being installed successfully and to identify any issues should they arise.

In an embodiment, the request oversight sub-system 316 monitors each of the robotic devices of the fleet of robotic devices 306 to determine whether the request transmitted to each of the robotic devices is being fulfilled. For instance, the request oversight sub-system 316 may obtain, from a robotic device agent 318 of a robotic device, the requested data or other status information that may be used to determine whether the request was fulfilled (e.g., indication that an update was installed successfully, etc.). If the request oversight sub-system 316 determines that a robotic device has fulfilled the request, the request oversight sub-system 316 may transmit the request output obtained from the robotic device agent 318 to the request retrieval agent 314 of the robotic device oversight system 304 for further processing. For instance, the request oversight sub-system 316 may transmit state information and other data associated with a robotic device, obtained from a robotic device agent 318, to the request retrieval agent 314. As another example, if the installation of an update is executed successfully or an issue is detected, the request oversight sub-system 316 may transmit a notification to the request retrieval agent 314 regarding the successful installation of the update or the issue detected from the robotic device, respectively.

The request retrieval agent 314 may evaluate the responses from the various robotic devices of the fleet, obtained via the request oversight sub-system 316, to determine whether sufficient responses have been obtained for fulfillment of the request obtained from the request datastore 310. For instance, based on the parameters of the request, the request retrieval agent 314 may determine whether there is enough data from the robotic devices of the fleet of robotic devices 306 for aggregation and generation of an output that corresponds to the state, performance, or other metric of the fleet of robotic devices 306 within the facility. In an embodiment, the request from the request datastore 310 includes executable instructions that, if executed by the request retrieval agent 314, causes the request retrieval agent 314 to process data obtained from the robotic devices of the fleet of robotic devices 306 to generate data corresponding to the overall status of the fleet of robotic devices 306 within the facility. These executable instructions may further specify conditions for determining whether the request can be fulfilled. For instance, if the request retrieval agent 314 does not receive output from a threshold number of robotic devices, the request retrieval agent 314 may determine that the request cannot be fulfilled. Alternatively, these conditions may define actions that may be taken by the request retrieval agent 314 in the event that a robotic device does not provide the requested output. For instance, the request retrieval agent 314 may denote that a robotic device is inoperative or otherwise unavailable in the event that a response is not obtained from the robotic device. This information may be aggregated to provide a negative indication regarding the status of the fleet of robotic devices 306.

If the request retrieval agent 314 determines that sufficient responses have been obtained for fulfillment of the request, the request retrieval agent 314 may aggregate these responses to generate, in accordance with the parameters of the request, an output that may be provided to the customer to fulfill its request. The request retrieval agent 314 may provide this output to the request processing sub-system 312 of the robotic device management service 302 to indicate that it has fulfilled the request in accordance with the parameters defined in the request obtained from the request datastore 310. In response to obtaining this output, the request processing sub-system 312 may make this output available to the customer via the client device 308.

In an embodiment, the request retrieval agent 314 processes responses from the robotic devices 306 as they are obtained from the request oversight sub-system 316 and prepares output in accordance with the parameters of the request. The request retrieval agent 314 may continuously stream this output as it is generated using newly obtained responses from the robotic devices 306 to the request processing sub-system 312. Thus, rather than determining whether sufficient responses have been obtained for fulfillment of the request, the request retrieval agent 314 may continuously process responses as they are obtained from the robotic devices 306 and stream the output to the request processing sub-system 312 for fulfillment of the request.

Figure 4:
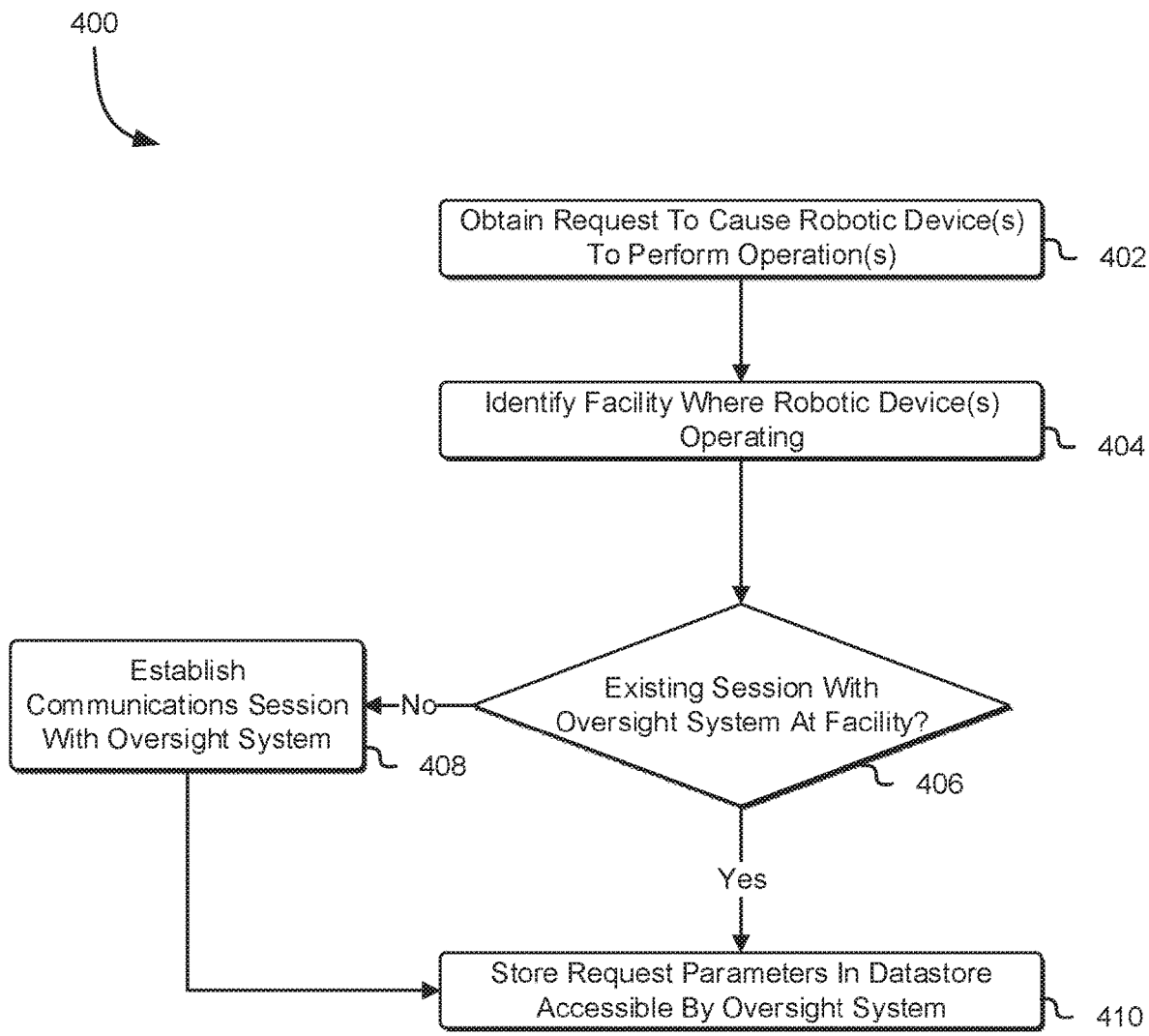
FIG. 4 shows an illustrative example of a process for storing a request for performance of a set of tasks by a fleet of robotic devices operating within a remote facility in a datastore accessible by a robotic device oversight system within the facility in accordance with at least one embodiment.

FIG. 4 shows an illustrative example of a process 400 for storing a request for performance of a set of tasks by a fleet of robotic devices operating within a remote facility in a datastore accessible by a robotic device oversight system within the facility in accordance with at least one embodiment. The process 400 may be performed by a request processing sub-system of the robotic device management service. At any time, the request processing sub-system of the robotic device management service may obtain 402 a request from a customer to cause a fleet of robotic devices within a facility to perform a set of operations. The set of operations may include the installation of a software update on to the robotic devices, to execute certain actions within the facility, to provide data corresponding to the state or performance of each robotic device within the facility, and the like. The request may be obtained from a client device agent operating on a client device used by a customer of the robotic device management service, as described above.

In response to the request, the request processing sub-system may identify 404 the facility where the fleet of robotic devices, managed at least partially by the robotic device management service, are operating. For instance, the request may comprise a facility identifier corresponding to the facility where the fleet of robotic devices that are to execute a set of operations for fulfillment of the request is located. Alternatively, the request may comprise an identifier corresponding to the fleet of robotic devices that is to execute the set of operations for fulfillment of the request. Using the identifier corresponding to the fleet of robotic devices, the request processing sub-system may query the customer account or other repository that maintains entries corresponding to relationships between fleets of robotic devices and facilities to identify the facility where the fleet of robotic devices is operating.

As noted above, the robotic device management service may maintain a persistent network connection with a robotic device oversight system within each facility. In an embodiment, the request processing sub-system determines 406 whether there is an existing communications session or other network connection between the robotic device management service and the robotic device oversight system within the identified facility. If the robotic device management service determines that there is no existing communications session between the robotic device management service and the robotic device oversight system of the facility (e.g., the facility was recently brought online, the robotic device oversight system was recently installed, there was no prior need for such a session, etc.), the request processing sub-system may establish 408 a communications session between the robotic device management service and the robotic device oversight system. The communications session may be established using transmission control protocol (TCP) connections and/or transport layer security (TLS) or other cryptographically protected connections.

If the request processing sub-system determines that a communications session between the robotic device management service and the robotic device oversight system of the facility exists or has otherwise been established, the request processing sub-system may store 410 the request parameters in a datastore accessible by the robotic device oversight system. For instance, the request processing sub-system may identify, within the datastore, a queue designated for the particular robotic device oversight system that is to distribute the request parameters to the various robotic devices of the fleet for fulfillment of the request. The request processing sub-system may generate a new entry within the queue that may specify the request parameters (e.g., executable instructions to be executed by the robotic device oversight system and/or the robotic devices of the fleet, machine learning models to be implemented by the robotic device oversight system for analysis and aggregation of data from the robotic devices, conditions to be satisfied for fulfillment of the request, etc.). In an embodiment, the request processing sub-system transmits a notification, over the communications session between the robotic device management service and the robotic device oversight system, to the robotic device oversight system to indicate that a new request has been added to the queue. Alternatively, the robotic device oversight system may obtain the request parameters from the queue through its periodic query of the queue.

Figure 5:
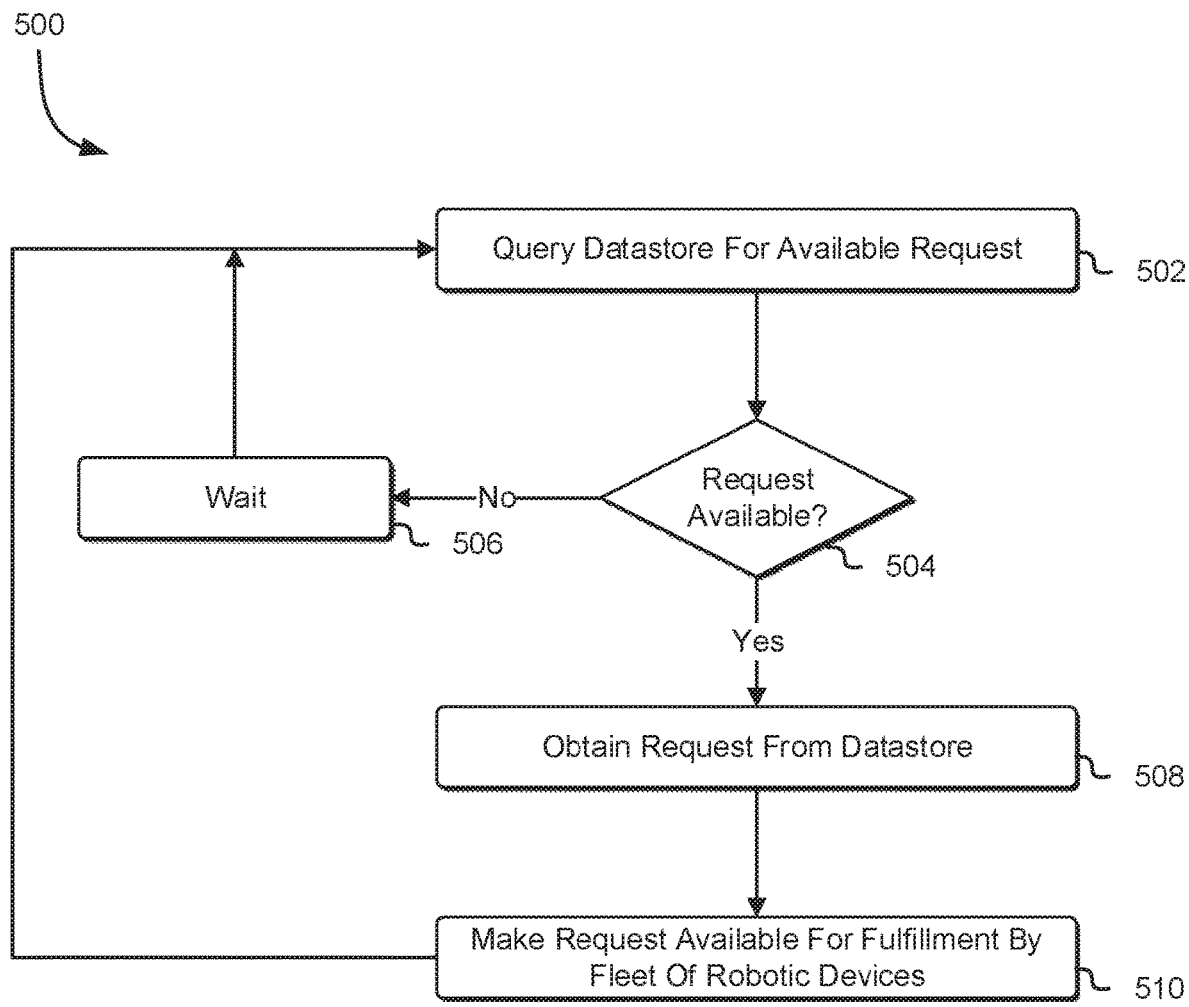
FIG. 5 shows an illustrative example of a process for obtaining pending requests from a datastore of the robotic device management service to make the pending requests available for fulfillment by a fleet of robotic devices in accordance with at least one embodiment.

FIG. 5 shows an illustrative example of a process 500 for obtaining pending requests from a datastore of the robotic device management service to make the pending requests available for fulfillment by a fleet of robotic devices in accordance with at least one embodiment. The process 500 may be performed by a request retrieval agent of a robotic device oversight system operating within a facility where a fleet of robotic devices may be operating. The robotic device oversight system may communicate with the robotic device management service over a persistent network connection established between the robotic device oversight system and the robotic device oversight system, as described above. The request retrieval agent of the robotic device oversight system may query 502 a request datastore of the robotic device management service to determine 504 whether a new request is available for processing. The request retrieval agent may query the queue periodically or in response to a triggering event. For instance, the request retrieval agent may access the queue at predefined intervals to determine whether a request has become available through the queue. Alternatively, the request retrieval agent may access the queue in response to a notification, from the robotic device management service, that specifies that a new request has been added to the queue. As another alternative, the request retrieval agent may access the queue in response to an indication that a previously obtained request has been fulfilled by the robotic devices of the fleet of robotic devices operating at the facility.

If the request retrieval agent determines that a new request is not available from the queue, the request retrieval agent may wait 506 a period of time or until a triggering event occurs before again querying the request datastore to determine whether a request is available. For instance, the request retrieval agent may wait for an indication from the robotic device management service that a new request has been added to the queue. Alternatively, the request retrieval agent may wait until another request has been fulfilled by the various robotic devices of the fleet of robotic devices before again querying the queue in the request datastore for a new request. The request retrieval agent may alternatively wait a predetermined period of time before again querying the queue in the request datastore to determine whether a new request is available.

If the request retrieval agent determines that a request is available from the queue in the request datastore, the request retrieval agent may obtain 508 the request from the queue and make 510 the request available to a request oversight sub-system of the robotic device oversight system for delivery to each of the robotic devices of the fleet of robotic devices. For instance, the request retrieval agent may store the request, and any executable instructions or data usable by the robotic devices of the fleet, within a datastore of the robotic device oversight system. This datastore may be accessible by a request oversight sub-system of the robotic device oversight system. The request oversight sub-system may obtain the request and any additional executable instructions or data from the datastore and distribute these to each available robotic device of the fleet of robotic devices. In some instances, the request retrieval agent may transmit the request and any additional executable instructions or data to the request oversight sub-system directly. Alternatively, the request retrieval agent may transmit a notification to the request oversight sub-system to indicate that a new request is available for processing by the robotic devices of the fleet. The request retrieval agent may continue to query 502 the request datastore of the robotic device management service to identify any newly added requests that are to be processed by the robotic devices of the fleet and make these newly added requests available to the request oversight sub-system in accordance with the operations described above in connection with the process 500.

Figure 6:
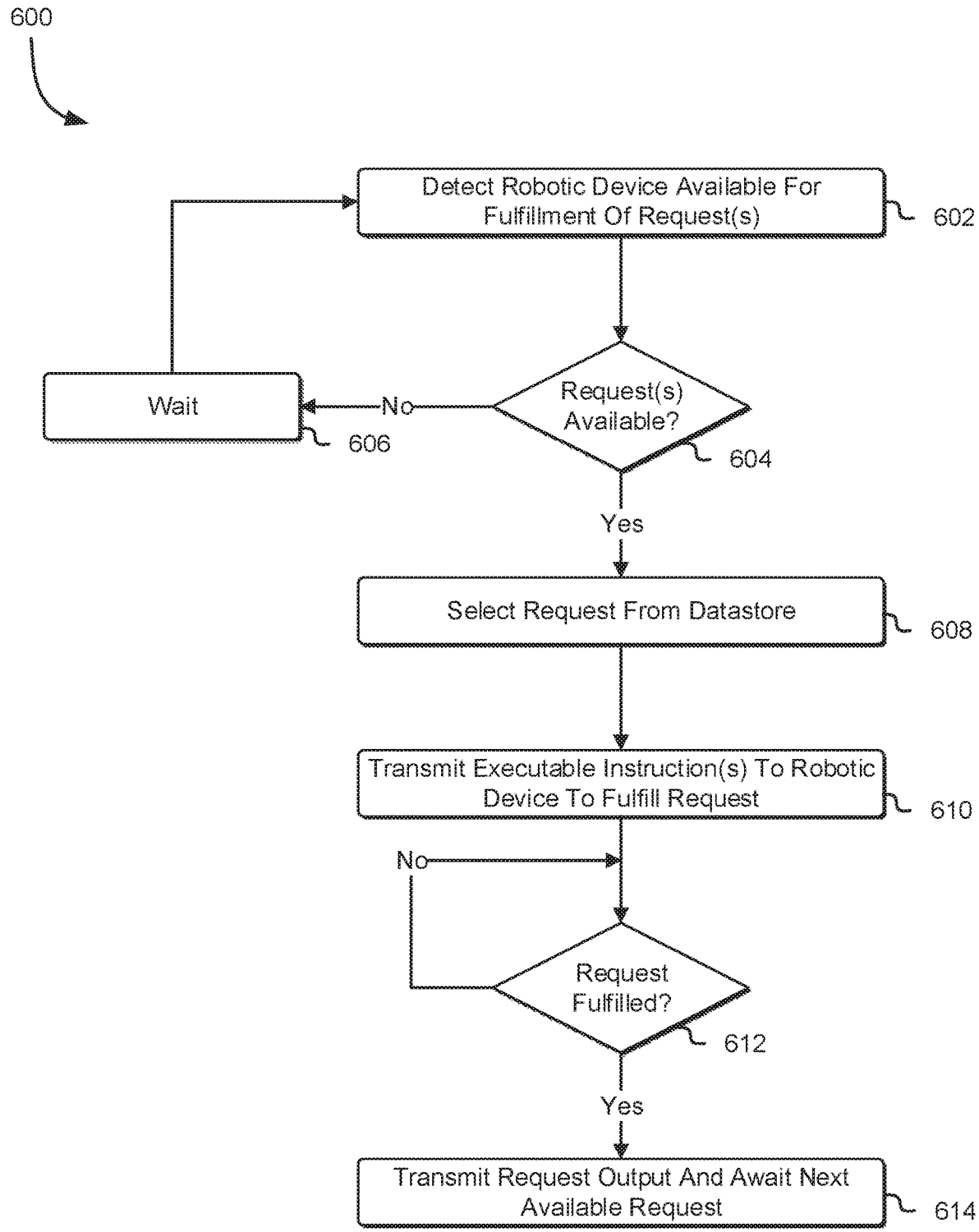
FIG. 6 shows an illustrative example of a process for causing a robotic device of a fleet of robotic devices to perform a set of tasks associated with a request obtained from the robotic device management service in accordance with at least one embodiment.

FIG. 6 shows an illustrative example of a process 600 for causing a robotic device of a fleet of robotic devices to perform a set of tasks associated with a request obtained from the robotic device management service in accordance with at least one embodiment. The process 600 may be performed by a request oversight sub-system of the robotic device oversight system operating in conjunction with a fleet of robotic devices within a facility or on-premises network. The request oversight sub-system may monitor the robotic devices of the fleet of robotic devices to detect 602 when a robotic device becomes available for fulfillment of a newly available request. For instance, a robotic device may transmit a notification to the request oversight sub-system to indicate that it has completed a set of tasks associated with a previously obtained request. Through receipt of this notification, the request processing sub-system may detect that the robotic device is available for the fulfillment of new requests obtained from the robotic device management service.

In response to detecting that a robotic device of the fleet has become available for the fulfillment of new requests, the request oversight sub-system may determine 604 whether a new request is available that can be provided to the robotic device. For instance, as described above, the request retrieval agent may store newly obtained requests within a datastore of the robotic device oversight system. The request oversight sub-system may query this datastore to identify any newly obtained requests that may be processed by the available robotic device. Alternatively, the request oversight sub-system may transmit a request to the request retrieval agent to cause the request retrieval agent to query the queue of the robotic device management service to determine whether a request is available for processing by the fleet of robotic devices. If a request is not available, the request oversight sub-system may wait 606 until a new request becomes available through the datastore or through the queue maintained by the robotic device management service or until the request oversight sub-system detects that another robotic device has become available for fulfillment of new requests.

If the request oversight sub-system determines that a request is available for processing by the available robotic device, the request oversight sub-system may select 608 the request from the datastore and transmit 610 executable instructions to the robotic device to allow the robotic device to fulfill the request. In an embodiment, if multiple requests are available, the request oversight sub-system evaluates the requests to determine which of these requests the robotic device can fulfill. For example, the request oversight sub-system may evaluate the operations to be performed by the robotic device for fulfillment of a request to determine whether the performance of these operations will have a negative impact on the performance of the robotic device or of other robotic devices of the fleet. Based on this evaluation of the pending requests to be fulfilled by the fleet of robotic devices, the request oversight sub-system may select 608 a request and transmit 610 executable instructions associated with the request to the robotic device.

The request oversight sub-system may monitor the robotic device to determine 612 whether the request has been fulfilled by the robotic device. For instance, the request oversight sub-system may obtain responses from the robotic device agent of the robotic device that may specify the operations being performed by the robotic device within the facility. The request oversight sub-system may use these responses to determine whether the robotic device has encountered an issue that prevents the robotic device from fulfilling the request. The request oversight sub-system may also use these responses to track the movements and other operations of the robotic device within the facility in relation to the operations performable via execution of the executable instructions transmitted to the robotic device. If the request has not been fulfilled, the request oversight sub-system may continue to monitor the robotic device.

If the robotic device executes the executable instructions successfully, such that the request is fulfilled, the robotic device may provide an output generated as a result of execution of the executable instructions to the request oversight sub-system. This output may include state information, performance information, or other data requested by a customer of the robotic device management service. Alternatively, the output may be a notification that specifies that the operations specified in the request were performed successfully. For example, if the request is to have the robotic device install an update, the output may specify that the update was installed on to the robotic device successfully. In response to obtaining the output from the robotic device, the request oversight sub-system may transmit 614 the output to the request retrieval agent for processing and aggregation with other output obtained from other robotic devices of the fleet executing the executable instructions associated with the request. The request oversight sub-system may await the next available request that may be processed by the robotic device, via detecting that the robotic device, or any other robotic device of the fleet, has now become available for fulfillment of new requests.

Figure 7:
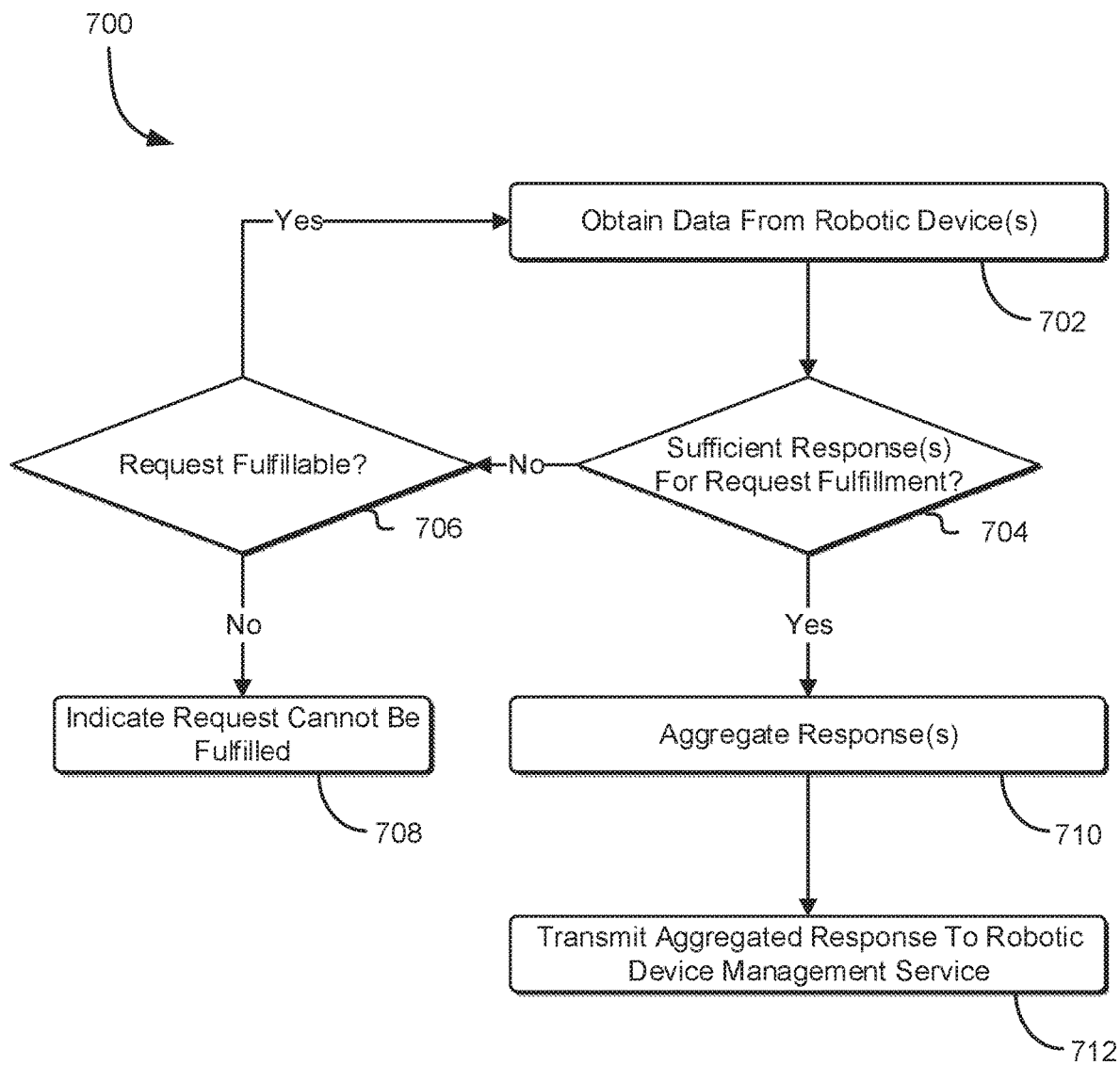
FIG. 7 shows an illustrative example of a process for aggregation of responses from robotic devices of the fleet of robotic devices for transmission to the robotic device management service for fulfillment of a request in accordance with at least one embodiment.

FIG. 7 shows an illustrative example of a process 700 for aggregation of responses from robotic devices of the fleet of robotic devices for transmission to the robotic device management service for fulfillment of a request in accordance with at least one embodiment. The process 700 may be performed by the request retrieval agent or other process or application of the robotic device oversight system that may process incoming data from various robotic devices to generate an output that may be used to fulfill a customer request. As the request oversight sub-system obtains responses and other output from the robotic devices of the fleet, the request oversight sub-system may provide these responses and other output to the request retrieval agent for processing. Thus, the request retrieval agent may obtain 702 the data (e.g., responses, output, etc.) from these robotic devices through the request oversight sub-system.

In response to obtaining the data from one or more robotic devices of the fleet for fulfillment of a customer request, the request retrieval agent may determine 704 whether sufficient responses have been obtained for fulfillment of the request. As noted above, based on the parameters of the request, the request retrieval agent may determine whether there is enough data from the robotic devices of the fleet of robotic devices for aggregation and generation of an output that corresponds to the state, performance, or other metric of the fleet of robotic devices within the facility. In an embodiment, the request from the request datastore includes executable instructions that, if executed by the request retrieval agent, causes the request retrieval agent to process data obtained from the robotic devices of the fleet of robotic devices to generate data corresponding to the overall status of the fleet of robotic devices within the facility.

These executable instructions may further specify conditions for determining 706 whether the request can be fulfilled. For instance, if the request retrieval agent does not receive output from a threshold number of robotic devices, the request retrieval agent may determine that the request cannot be fulfilled. If the request cannot be fulfilled, the request retrieval agent may transmit a notification to the robotic device management service to indicate 708 that the request cannot be fulfilled. Alternatively, these conditions may define actions that may be taken by the request retrieval agent in the event that a robotic device does not provide the requested output. For instance, the request retrieval agent may denote that a robotic device is inoperative or otherwise unavailable in the event that a response is not obtained from the robotic device. This information may be aggregated to provide a negative indication regarding the status of the fleet of robotic devices. Thus, if the request retrieval system determines that the request may still be fulfilled, the request retrieval agent may await additional data from the remaining robotic devices or begin aggregating the responses from the robotic devices.

If the request retrieval agent determines that it has obtained sufficient responses from the fleet of robotic devices for fulfillment of the request, the request retrieval agent may aggregate 710 these response to generate an output that may be provided to the requestor (e.g., customer) for fulfillment of the request. The request retrieval agent may transmit 712 this output to the request processing sub-system of the robotic device management service to indicate that it has fulfilled the request in accordance with the parameters defined in the request obtained from the request datastore. In response to obtaining this output, the request processing sub-system may make this output available to the customer via the client device.

Figure 8:
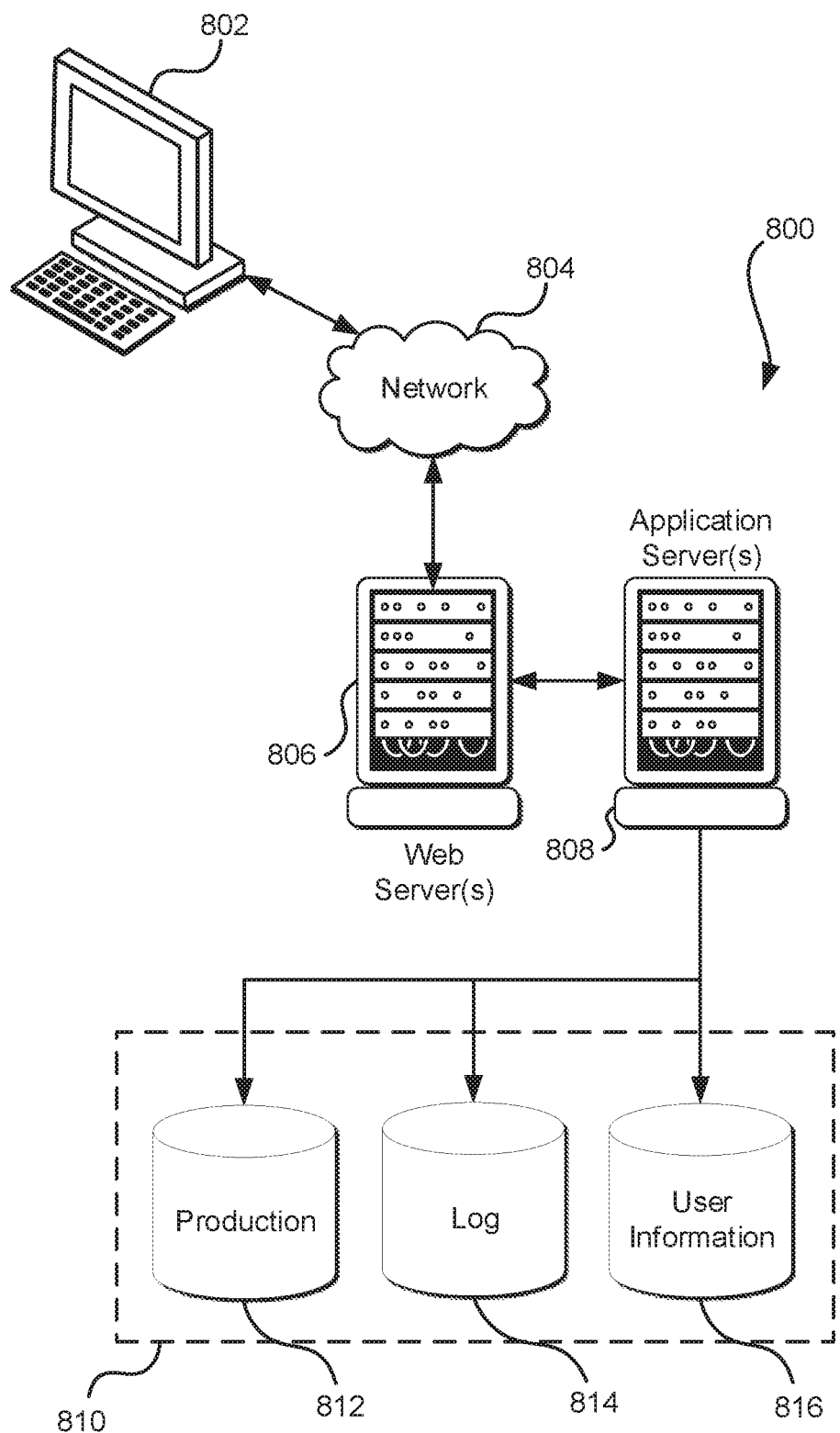
FIG. 8 shows an illustrative example of a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining, from a customer of a robotic device management service, a first request to install an update on a fleet of robotic devices associated with a facility identifier and managed at least partially by the robotic device management service, the first request comprising the facility identifier;
   storing the update in a queue of tasks to be performed for the fleet of robotic devices;
   obtaining, over a persistent connection between the robotic device management service and an oversight device that operates in a facility associated with the facility identifier and where the fleet of robotic devices operate, a second request for a pending task;
   in response to the second request, providing the oversight device with the update to cause the oversight device to schedule and install the update on the fleet of robotic devices;

monitoring installation of the update on the fleet of robotic devices to ensure that the update is being installed successfully and to fulfill the first request; and responsive to encountering, during the installation, an issue related to the installation, rolling back the update.

2. The computer-implemented method of claim 1, further comprising:

obtaining, from the oversight device, an output indicating whether the installation of the update on the fleet of robotic devices was successful, the output generated based on aggregation of responses, from individual robotic devices of the fleet of robotic devices, indicating whether the installation of the update was successful; and transmitting the output to the customer of the robotic device management service.

3. The computer-implemented method of claim 1, further comprising:

obtaining, from the oversight device, an indication that the installation of the update was successful, the oversight device storing thereon data corresponding to the installation of the update on individual robotic devices of the fleet of robotic devices;

retrieving the oversight device from the facility;

obtaining, from the oversight device, the data; and storing the data to be accessible to the customer of the robotic device management service.

4. The computer-implemented method of claim 1, wherein providing the oversight device with the update further causes the oversight device to evaluate operations being performed by individual robotic devices of the fleet of robotic devices for scheduling the update on the fleet of robotic devices.

5. A system, comprising:

one or more processors; and memory that stores computer-executable instructions that, if executed by the one or more processors, cause the system to:

obtain, from a client device, a first request to cause a fleet of robotic devices managed at least partially by a robotic device management service to perform a set of tasks;

store the first request in a queue of requests to be fulfilled by the fleet of robotic devices;

obtain, from an oversight device that operates in a facility where the fleet of robotic devices operate, a second request for a pending request from the queue of requests to be fulfilled by the fleet of robotic devices;

in response to the second request for the pending request:

provide the oversight device with the first request to cause the oversight device to schedule performance of the set of tasks by the fleet of robotic devices;

monitor the performance of the set of tasks by the fleet of robotic devices to ensure that the first request is being fulfilled in accordance with parameters of the first request;

during the performance of the set of tasks, obtain responses from individual robotic devices of the fleet of robotic devices indicating whether the first request is being fulfilled; and use the responses to determine whether a robotic device of the fleet of robotic devices has encountered an issue that prevents the robotic device from fulfilling the first request.

6. The system of claim 5, wherein the computer-executable instructions, if executed by the one or more processors, further cause the system to, responsive to determining that the set of tasks was performed successfully:

obtain, from the oversight device, an output corresponding to the first request, the output generated via aggregation of the responses; and provide, to the client device, the output to fulfill the first request.

7. The system of claim 5, wherein:

the first request specifies an identifier corresponding to the facility where the fleet of robotic devices operate; and the computer-executable instructions, if executed by the one or more processors, further cause the system to evaluate the first request to utilize the identifier to identify the queue of requests to be fulfilled by the fleet of robotic devices.

8. The system of claim 5, wherein the computer-executable instructions, if executed by the one or more processors, further cause the system to:

transmit a third request to a delivery service to cause the delivery service to deliver the oversight device to the facility;

detect that the oversight device has been activated at the facility; and establish a persistent communications session between the robotic device management service and the oversight device.

9. The system of claim 5, wherein the computer-executable instructions, if executed by the one or more processors, further cause the system to establish, in response to the first request, a communications session between the robotic device management service and the oversight device.

10. The system of claim 5, wherein:

the set of tasks include installation of an update onto the fleet of robotic devices; and the computer-executable instructions, if executed by the one or more processors, further cause the system to provide, to the oversight device and with the first request, the update to cause the oversight device to distribute the update to individual robotic devices of the fleet of robotic devices.

11. The system of claim 5, wherein:

the first request includes second executable instructions that, if executed by the oversight device, cause the oversight device to analyze information regarding performance of the set of tasks to generate an output; and the computer-executable instructions, if executed by the one or more processors, further cause the system to provide, to the oversight device, the second executable instructions to cause the oversight device to analyze the information and generate the output.

12. The system of claim 5, wherein:

the first request from the client device includes a machine learning model for processing data from individual robotic devices of the fleet of robotic devices to determine a status of the fleet of robotic devices; and the computer-executable instructions, if executed by the one or more processors, further cause the system to provide, to the oversight device, the machine learning model to cause the oversight device to utilize the machine learning model and the data from the individual robotic devices of the fleet of robotic devices to determine the status.

13. A non-transitory computer-readable storage medium storing thereon executable instructions that, as a result of being executed by one or more processors of a computer system, cause the computer system to at least:
- query, from a datastore of a robotic device management service, a queue to obtain a pending request for execution of a set of tasks by a fleet of robotic devices managed at least partially by the robotic device management service;
- transmit, to individual robotic devices of the fleet of robotic devices, second executable instructions that, if executed by the individual robotic devices, cause the individual robotic devices to perform the set of tasks;
- monitor performance of the set of tasks by the individual robotic devices of the fleet of robotic devices;
- during the performance of the set of tasks, obtain responses from the individual robotic devices of the fleet of robotic devices; and
- determine, based on the responses, whether a robotic device of the fleet of robotic devices has encountered an issue that prevents the robotic device from fulfilling the pending request.

14. The non-transitory computer-readable storage medium of claim 13, wherein:
- the pending request is for installation of an update onto the fleet of robotic devices, the pending request including the update; and
- the executable instructions, as a result of being executed by the one or more processors, further cause the computer system to distribute, to the individual robotic devices of the fleet of robotic devices and in addition to the second executable instructions, the update.

15. The non-transitory computer-readable storage medium of claim 14, wherein:
- the issue occurs during installation of the update; and
- the executable instructions, as a result of being executed by the one or more processors, further cause the computer system to:
  - determine that the robotic device of the fleet of robotic devices has encountered the issue; and
  - transmit third executable instructions to the robotic device that, if executed by the robotic device, cause the robotic device to roll back the update.

16. The non-transitory computer-readable storage medium of claim 13, wherein the executable instructions, as a result of being executed by the one or more processors, further cause the computer system to:
- obtain, from the individual robotic devices of the fleet of robotic devices, data generated as a result of the performance of the set of tasks;
- aggregate the data to generate an output; and
- provide the output to the robotic device management service for fulfillment of the pending request.

17. The non-transitory computer-readable storage medium of claim 16, wherein the executable instructions that, as a result of being executed by the one or more processors, cause the computer system to aggregate the data to generate the output further cause the computer system to evaluate the data to determine that a threshold amount of responses have been obtained from the individual robotic devices of the fleet of robotic devices.

18. The non-transitory computer-readable storage medium of claim 16, wherein the executable instructions that, as a result of being executed by the one or more processors, cause the computer system to aggregate the data to generate the output further cause the computer system to utilize a machine learning model provided with the pending request to process the data for generating the output.

19. The non-transitory computer-readable storage medium of claim 16, wherein the pending request includes a query, the query specifying parameters for the aggregation of the data for the generation of the output.

20. The non-transitory computer-readable storage medium of claim 13, wherein the executable instructions, as a result of being executed by the one or more processors, further cause the computer system to:
- establish a persistent network connection with the robotic device management service; and
- access, over the persistent network connection, the robotic device management service to query the datastore.

* * * * *